US012801642B2

(12) United States Patent
Toledo et al.

(10) Patent No.: US 12,801,642 B2
(45) Date of Patent: Nov. 17, 2026

(54) HALLUCINATION MITIGATION WITH EXTENDED LOSS FUNCTION IN RETRIEVAL AUGMENTED GENERATION SYSTEMS

(71) Applicant: Dell Products L.P., Round Rock, TX (US)

(72) Inventors: Yanexis Pupo Toledo, Niterói (BR); Pablo Nascimento da Silva, Niterói (BR)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 18/962,826

(22) Filed: Nov. 27, 2024

(65) Prior Publication Data

US 2026/0147796 A1 May 28, 2026

(51) Int. Cl.
*G06F 16/3329* (2025.01)
*G06F 16/28* (2019.01)
*G06F 16/334* (2025.01)

(52) U.S. Cl.
CPC ........ *G06F 16/3329* (2019.01); *G06F 16/284* (2019.01); *G06F 16/3347* (2019.01)

(58) Field of Classification Search
None
See application file for complete search history.

(56) References Cited

U.S. PATENT DOCUMENTS

2024/0202530 A1 * 6/2024 Meng ..................... G06N 3/084

OTHER PUBLICATIONS

Bonifacio et al. "InPars: Data Augmentation for Information Retrieval using Large Language Models." arXiv, Feb. 10, 2022, https://arxiv.org/abs/2202.05144. Accessed Jun. 24, 2026. (Year: 2022).*
Alabbasi et al. "TeleOracle: Fine-Tuned Retrieval-Augmented Generation with Long-Context Support for Network." arXiv, Nov. 4, 2024, https://arxiv.org/abs/2411.02617. Accessed Jun. 24, 2026. (Year: 2024).*
Towhidul Islam Tonmoy, S. M., et al. A Comprehensive Survey of Hallucination Mitigation Techniques in Large Language Models. arXiv prints, 2024, p. arXiv: 2401.01313.

(Continued)

*Primary Examiner* — Hai Phan
*Assistant Examiner* — Jon Christopher Meis
(74) *Attorney, Agent, or Firm* — Workman Nydegger

(57) ABSTRACT

Hallucination mitigation in retrieval augmented generation (RAG) systems is disclosed. A preference dataset is automatically generated using a RAG system based on known [query, documents] pairs. The documents recovered by a retriever can be sorted or ordered according to their similarity values and the relevant documents can be added to the list if necessary. Using an adjustable threshold value, the most similar documents are used as context to generate a preference response and less similar documents are used as context to generate a non-preference response. The preference response, non-preference response, and query are stored in a preference dataset. Using an extended loss, a copy of a generator is trained or updated using the preference dataset and a standard response.

20 Claims, 17 Drawing Sheets

(56) References Cited

OTHER PUBLICATIONS

Gao, Yunfan, et al. Retrieval-augmented generation for large language models: A survey. arXiv preprint arXiv:2312.10997, 2023.
Rafailov, Rafael, et al. Direct preference optimization: Your language model is secretly a reward model. 37th Conference on Neural Information Processing Systems, 2023.
Hicke, Yann, et al. AI-TA: Towards an Intelligent Question Answer Teaching Assistant using Open Source LLMs. arXiv preprint arXiv:2311.02775 ,2023.

* cited by examiner

```
import torch.nn.functional as F
def dpo_loss (pi_logps, ref_logps, yw_idxs, yl_idxs, beta):
    pi_logps: policy logprobs: log(π_θ (y_w|x)), log (π_θ (y_l|x))
    ref_logps: reference model logprobs, log(π_ref (y_w|x)), log (π_θref (y_l|x))
    yw_idxs: preferred completion indices in [0, B-1]
    yl_idxs: dispreferred completion indices in [0, B-1]
    beta: temperature controlling strength of KL penalty.
    # Each pair of (yw_idxs[i], yl_idxs[i]) represents the
    # indices of a single preference pair.
    pi_yw_logps, pi_yl_logps = pi_logps[yw_idxs], pi_logps[yl_idxs]
    ref_yw_logps, ref_yl_logps = ref_logps[yw_idxs], ref_logps[yl_idxs]
    pi_logratios = pi_yw_logps - pi_yl_logps
    ref_logratios = ref_yw_logps - ref_yl_logps
    loss = -F.logsigmoid(beta * (pi_logratios - ref_logratios))
    return loss
```

302

1. Calculate the probability for $(x, y_w)$ and $(x, y_l)$ from the $\pi_{ref}$ model (forward only). 306
2. Calculate the probability for $(x, y_w)$ and $(x, y_l)$ from the $\pi_\theta$ model. 308
3. Calculate $\mathcal{L}_{DPO}$ and backpropagate to update. Repeat. 310

304

Figure 3

```
DPO_dataset_dict = {
  "prompt": [
     "My computer is running slow.",
     "I'm having trouble connecting my printer to the network."
  ],
  "chosen": [
     "It might be helpful to clear your computer's temporary files. Here's a
step-by-step guide: [link].",
     "Try restarting your printer and the router. If that doesn't work,
check if the printer drivers are up to date and follow the setup
instructions in the documentation."
  ],
  "rejected": [
     "That's not a technical issue, but I'd recommend checking if you have
too many programs open consuming resources.",
     "This issue might be related to your network configuration. Make sure
the password is correct and the network is available."
  ]
}
```

402, 404, 406, 400

Figure 4

552 Given the tensor $QD$ of $[query, documents]$ pairs.

554 for $id$ in range $(QD)$:

$query, documents \ = \ QD\,[id, :]$ $[retrieved_{documents}, \ similarity] = RAG_{retriever}\ (query)$ if $retrieved_{documents}.index(documents) > len(documents + 1)$:

\# means that the most relevant documents were not placed at the top of the ranking list.

\# So, we allocate it to the firsts positions and change its similarity value to the maximum.

560 $y_w Prompt = retrieved_{documents}.similarity > \ \tau$

562 $y_l Prompt = retrieved_{documents}.similarity < \ \tau$

556 $y_w = RAG_{generator}(context_{prompt\_y_w})$

558 $y_l = RAG_{generator}(context_{prompt\_y_l})$

550

Figure 5D

| Query 802 | Documents 804 |
|---|---|
| What are the connectivity options available in Product 1? 816 | Product 1 Setup and Specifications 806<br>Product 1 Service Manual 808 |
| Whare are the memory options availabe in Product 2? | Product 2 Service Manual 810<br>Product 2 Setup and Specifications 812 |
| Whare are the principal advantages of buying product 3? | Product 3 Setup and Specifications 814 |

800

Figure 8A

```
import torch.nn.functional as F
def dpo_loss (pi_logps, ref_logps, yw_idxs, yl_idxs, beta):
  pi_logps: policy logprobs: $\log(\pi_\theta(y_w|x)), \log(\pi_\theta(y_l|x)), \log(\pi_\theta(y_s|x))$
  ref_logps: reference model logprobs, $\log(\pi_{ref}(y_w|x)), \log(\pi_{\theta ref}(y_l|x)), \log(\pi_{\theta ref}(y_s|x))$
  yw_idxs: preferred completion indices in [0, B-1]
  yl_idxs: dispreferred completion indices in [0, B-1]
  beta1: temperature controlling strength of KL penalty of $y_w$ and $y_l$.
  beta2: temperature controlling strength of KL penalty of $y_s$ and $y_l$.
  $\alpha$: relative weight of preferences
  # Each pair of (yw_idxs[i], yl_idxs[i]) represents the
  # indices of a single preference pair.
  pi_yw_logps, pi_yl_logps, pi_ys_logps = pi_logps[yw_idxs], pi_logps[yl_idxs], pi_logps[ys]
  ref_yw_logps, ref_yl_logps, ref_ys_logps = ref_logps[yw_idxs], ref_logps[yl_idxs], ref_logps[ys]
  pi_logratios = pi_yw_logps - pi_yl_logps
  pi_logratiosys = pi_ys_logps - pi_yl_logps
  ref_logratios = ref_yw_logps - ref_yl_logps
  ref_logratiosys = ref_ys_logps - ref_yl_logps
  loss1 = -F.logsigmoid(beta1 * (pi_logratios - ref_logratios))
  loss2 = F.logsigmoid(beta2 * (pi_logratiosys - ref_logratiosys))
  loss = $\alpha$ loss1 – (1- $\alpha$)loss2
  return loss
```

900

Figure 9

HALLUCINATION MITIGATION WITH EXTENDED LOSS FUNCTION IN RETRIEVAL AUGMENTED GENERATION SYSTEMS

TECHNOLOGICAL FIELD OF THE DISCLOSURE

Embodiments disclosed herein generally relate to mitigating hallucinations in retrieval augmented generation (RAG) systems. More particularly, at least some embodiments relate to systems, hardware, software, computer-readable media, and methods for mitigating hallucinations in retrieval augmented generation systems with an extended loss function.

BACKGROUND

The RAG framework has emerged an approach for adding external knowledge to large language models (LLMs) to obtain more accurate and relevant answers from augmented context generation. RAG systems are less prone to hallucinations because each answer is based on recovered evidence that may be drawn from the externally added sources.

RAG systems operate through a two-step or two-stage process. First, a retriever acquires the data (documents) needed to respond to specific queries. Second, a generator formulates answers using the retrieved information. However, RAG systems may still hallucinate.

More specifically, the ability of LLMs to write or generate human-like text continues to improve, but there is still a fundamental challenge surrounding their tendency to hallucinate, which includes generating content that appears factual but is not substantiated. Current hallucination mitigation techniques encompass fine-tuning mechanisms, external information retrieval, and preference alignment.

Supervised Fine Tuning (SFT) is less suited to infusing knowledge into the model because SFT cannot keep up with frequently changing data, can leak sensitive information, lacks explainability due to lack of references, and risks catastrophic forgetting. Reinforcement Learning with Human Feedback (RLHF) is an implementation of human preference learning, with results equivalent to the recently released algorithm Direct Preference Optimization (DPO). However, RLHF, is very unstable and complex.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings, in which:

FIG. 3 discloses aspects of direct policy optimization loss;

FIG. 4 discloses aspects of a preference dataset;

FIGS. 5A-5D disclose aspects of automatically generating a preference dataset and aspects of aligning a generator using extended direct policy optimization loss;

FIGS. 8A-8E illustrate an example of mitigating hallucinations in a retrieval augmented generation system;

FIG. 9 discloses aspects of extended direct policy optimization loss; and

DETAILED DESCRIPTION OF SOME EXAMPLE EMBODIMENTS

Embodiments disclosed herein generally relate to mitigating hallucinations in retrieval augmented generation (RAG) systems. More particularly, at least some embodiments relate to systems, hardware, software, computer-readable media, and methods for mitigating hallucinations in RAG systems by fine-tuning the LLM generator and/or using extended direct policy optimization loss.

RAG is configured to improve the outputs or responses of LLMs. In one example, a source that provides reliable knowledge is added to the knowledge of an LLM and may be used to generate accurate and up-to-date responses. LLMs are trained on large datasets and employ billions of parameters to generate original responses in applications such as question answering (QA), language translation, sentence completion, customer service, and the like. Because the training data may be static (retraining with new data requires time), unpredictability and knowledge limitations are present. Thus, LLMs may output false, outdated, or inaccurate information (hallucinations), which affects the trust that users place in the LLMs.

The RAG framework seeks to resolve these issues by retrieving data from trusted sources. Directing LLMs to trusted sources offers more control over the responses and increases transparency for users. The robust capabilities of LLMs can be extended to specific domains or an organization's internal knowledge base, without the need for retraining the model. RAG architectures represent a cost-effective way to improve LLMs outputs, ensuring relevance, accuracy, and usefulness in diverse contexts. RAG architectures combine the power of retrieval systems with the generative capabilities of neural networks (e.g., LLMs) to improve performance.

Figure 1:
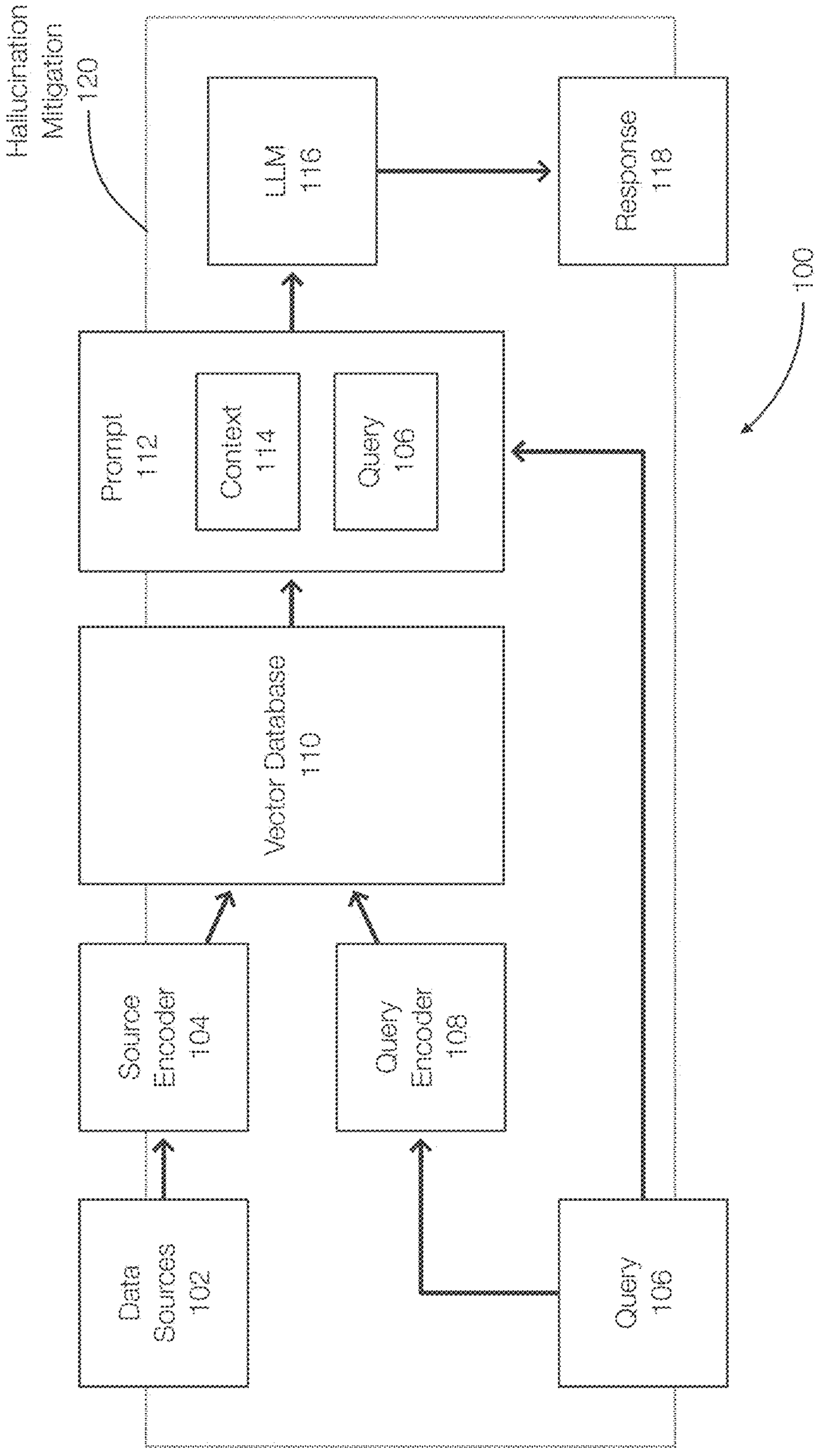
FIG. 1 discloses aspects of an example of a retrieval augmented generation system with hallucination mitigation.

FIG. 1 discloses aspects of a RAG system with hallucination mitigation. The RAG system 100 includes a vector database 110 configured to store vectors (e.g., text embeddings or documents represented in vector form). In this example, documents from data sources 102 are encoded by a source encoder 104 to generate the embeddings or vectors stored in the vector database 110. A query 106 may similarly be converted into a vector or an embedding by a query encoder 108 (may be the same encoder as the source encoder 104). This allows the query 106 to be compared to the documents in the data sources 102 using vectors or embeddings. The most similar sources or documents, based on the comparison of the vector of the query 106 with the vectors in the vector database 110, are included in a prompt 112 as context 114. Thus, the prompt 112 is enhanced with context and includes the query 106 and the context 114. The prompt 112 may be input to an LLM (Large Language Model) 116, which generates a response 118 to the query 106.

In this example, the data sources 102 are an example of documents or content that is external to the LLM 116. The RAG system 100 thus allows the data sources 102 to be added to the knowledge of the LLM 116 without retraining the LLM 116 and allows the LLM 116 to generate responses that are more accurate.

When a user submits the query 106, the RAG system 100 retrieves information that is specifically relevant from the data sources 102, which may include authoritative knowledge sources or other relevant data sources. This allows the context 114 to be generated in a manner that includes the data sources 102. In one example, the prompt 112 is thereby enhanced with the context 114 and provides details beyond what the LLM 116 already knows or has learned or has access to from other sources. In contrast to traditional LLMs that rely solely on their training data, the RAG system 100 allows the LLM to incorporate real internal data (e.g., the data sources 102) and provide responses or answers that are more accurate and context aware.

Using the data sources 102, the RAG system 100 is less susceptible to hallucinations. The response 118, for example, may depend on the existence of data in an external knowledge base, on the granularity of the retriever and context prompt, and on the generator.

Figure 2:
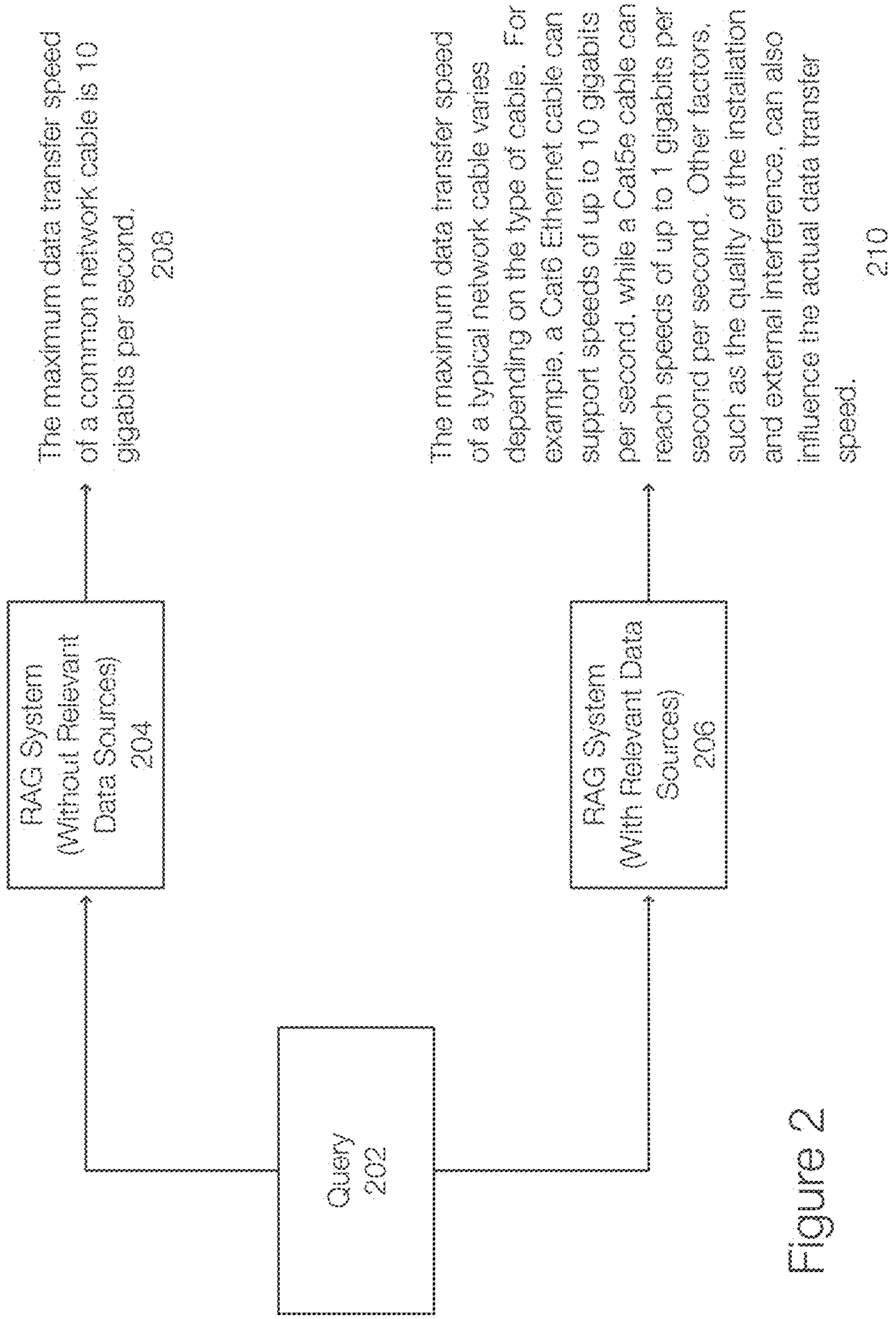
FIG. 2 discloses aspects of a hallucination in a RAG system.

FIG. 2 discloses aspects of hallucinations in RAG systems. FIG. 2 illustrates a query 202 that is input into a RAG system 204 without relevant data sources (e.g., without data sources 102) and into a RAG system 206 with relevant data sources (e.g., with data sources 102). The response 208 of the RAG system 204 is a hallucination because it was generated without access to relevant information, based on an incorrect interpretation of the context of the query 202, or the like. The response 208 may be a hallucination also because it is wholly or partially incorrect.

In contrast, the response 210 has access to relevant documents and includes detail related to specific types of network cables, network speeds of specific cable based on technical specifications (the relevant data sources) and also provides information on other characteristics that may influence actual data transfer speed. The ability to provide context, such as the context 114, and provide specific and relevant data sources, improves the responses generated by LLMs.

In this example, the query 202 may have been "What is the maximum data transfer speed of a common network cable?". As illustrated in FIG. 2, the response 210 is more detailed, more relevant, and more accurate than the response 208.

Direct Preference Optimization (DPO) is an example of a stable, efficient, and computationally light technique for aligning LLMs using a simple classification loss function $\mathcal{L}_{DPO}$:

$$\mathcal{L}_{DPO}(\pi_\theta;\pi_{ref}) = -\mathbb{E}_{(x,y_w,y_l)\sim D}\left[\log\sigma\left(\beta\log\frac{\pi_\theta(y_w\mid x)}{\pi_{ref}(y_w\mid x)} - \beta\log\frac{\pi_\theta(y_l\mid x)}{\pi_{ref}(y_l\mid x)}\right)\right] \quad (I)$$

This loss function can be optimized directly on a preference dataset $$D = \{x^{(i)}, y_w^{(i)}, y_l^{(i)}\},$$

where $x^{(i)}$ is a prompt, $$y_w^{(i)}$$

is a preference response(s) and $$y_l^{(i)}$$

is a non-preference response(s) in the instance (i). In this example, the LLM acts as its own reward model and is optimized directly through maximum likelihood over the set of preferences, with a goal of maximizing the difference between the log-likelihood scores of preference responses and non-preference responses.

Although the term $\mathcal{L}_{DPO}$ seems complex, the term $\mathcal{L}_{DPO}$ implies a simple training procedure represented in FIG. 3.

FIG. 3 illustrates an example of an algorithm for conventional DPO loss. The algorithm 302 may be represented generally as including three steps 304 that are performed relative to a reference version of a model $\pi_{ref}$.

Starting with a reference model ($\pi_{ref}$) embodiments may iterate through each triple (x, $y_w$, $y_L$) and perform three main steps or operations.

The first step 306 is to calculate the probability for each of (x, $y_w$) and (x, $y_L$) from the $\pi_{ref}$ model (forward only).

The second step 308 is to calculate the probability for each of (x, $y_w$) and (x, $y_l$) from an optimized mode ($\pi_\theta$).

The third step 310 is to calculate $\mathcal{L}_{DPO}$ and backpropagate to update the mode ($\pi_\theta$) being optimized.

These steps 304 are repeated as needed or until alignment of the mode ($\pi_\theta$) being optimized is completed.

In a conventional DPO framework, a human evaluator is required to ranks the outcome of a benchmark policy and label the winning pair $y_w$ and losing pair $y_l$.

FIG. 4 discloses aspects of a preference dataset. Preference data, in one example, is a curated set of alternative responses to a specific prompt. Conventionally, these responses are evaluated by annotators based on specified guidelines. One objective is to classify these options from most preferred to least preferred. Ranking the options provides insights into human preferences used to tune models to produce results that align with human expectations.

Embodiments of the invention, in contrast, are configured to automatically generate the preference dataset 400 without human intervention.

When training a model (e.g., an RAG generator) using DPO, the preference dataset may have a particular format. Because the model is trained, in one example, to optimize the preference between two sentences directly, the dataset may reflect this structure. The dataset 400 is an example of this structure. The dataset 400 includes three main entries: a prompt (or query) 402, a chosen or preference response 404 ($y_w$) and a rejected or non-preference response 406 ($y_l$). The prompt 402 includes context inputs, the chosen response 404 holds or includes the chosen or preference responses, and the rejected response 406 holds or includes negative or non-preference responses.

In the dataset 400, the chosen response 404 may be a response (or responses) that a human may consider appropriate and relevant to the query submitted by a user. The chosen response 404 may be phrased in a manner that provides a clear solution or guidance with respect to the query or prompt 402. The chosen response 404 is generally aligned with the LLM goal of providing effective and helpful responses.

The rejected response 406, in contrast, includes responses that the human may consider inappropriate, irrelevant, or unsatisfactory. The rejected response 406 may include incorrect information or partially correct information, be unrelated to the query, not provide a useful solution or answer to the query, or the like. Non-preference responses included in the rejected response 406 may represent deviations from the LLM objective or generic responses that do not adequately respond to the query or prompt 402.

By feeding an LLM with a dataset that includes examples of both preference responses (e.g., 404) and non-preference responses (e.g., 406), the LLM may learn to distinguish between appropriate and inappropriate answers to different types of queries. This improves the LLM's (or other model) ability to generate accurate and useful responses in similar situations.

Figure 5A:
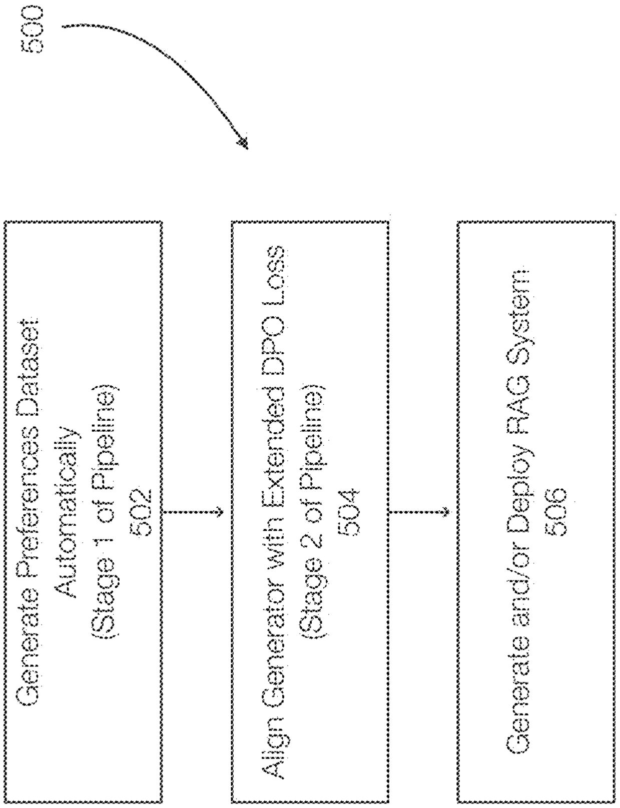

FIG. 5A discloses aspects of mitigating hallucinations in RAG systems. As previously discussed, a RAG system typically includes a retriever and a generator. An LLM is an example of a generator. A RAG system advantageously provides an LLM with access to specific and specialized documents or sources. RAG systems add context to LLM prompt to generate improved responses, but this does not guarantee that hallucinations will not occur. DPO may be used to fine tune a RAG system in order to avoid generic or out of context responses.

Embodiments of the invention relate to automatically generating a preference dataset and avoid the need for a human inside the loop. Embodiments of the invention further relate to reducing or mitigating hallucinations in RAG systems.

A method 500 illustrates a two stage process for generating or creating a RAG system. In this example, a preference dataset is automatically generated 502 during a first state of a pipeline. Generating 502 the preference dataset assumes, in one example, that pairs [query-documents] are available. Using a RAG system, the retriever can be adjusted to force the retrieval of relevant or irrelevant (or less relevant) documents according to a threshold value. More specifically, documents may be retrieved based on their similarity to a query. By setting a threshold value (e.g., a threshold similarity), preference response pairs $y_w$ or non-preference response pairs $y_l$ can be automatically generated. More specifically, the threshold value may be used to determine which documents are included as context in a prompt. When the most relevant documents are included in the context, preference responses are generated. When less relevant documents are included in the context, non-preference responses are generated.

In a second stage, the triples generated in the first stage (query, $y_w$, $y_l$), together with a standard response $y_s$, are used to align 504 the RAG generator using an extended DPO loss function. After the second stage is completed, the previous generator (e.g., the reference generator or model ($\pi_{ref}$) is replaced with the aligned generator or model ($\pi_\theta$) and the RAG system is ready to respond more accurately or appropriately with respect to the domain and avoid hallucinations when enough or sufficient context is not available. Thus, the RAG system is generated and/or deployed 506.

In one example, the method 500 is configured to include automatically generating 502 a preference dataset from known query-document pairs in an existing RAG structure with an adjustable threshold in the retriever to manage contexts and generate preference pairs ($y_w$, $y_l$). The method 500 also aligns 504 the RAG generator with an extended DPO loss.

In one example, the hallucination problem is effectively reformulated as a preference response distance task with an extended DPO loss. In this scenario, a model (e.g., RAG generator or LLM) is configured or caused to favor a preference response $y_w$ and approach a standard response $y_s$ when the available context is insufficient to generate an accurate response.

Figure 5B:
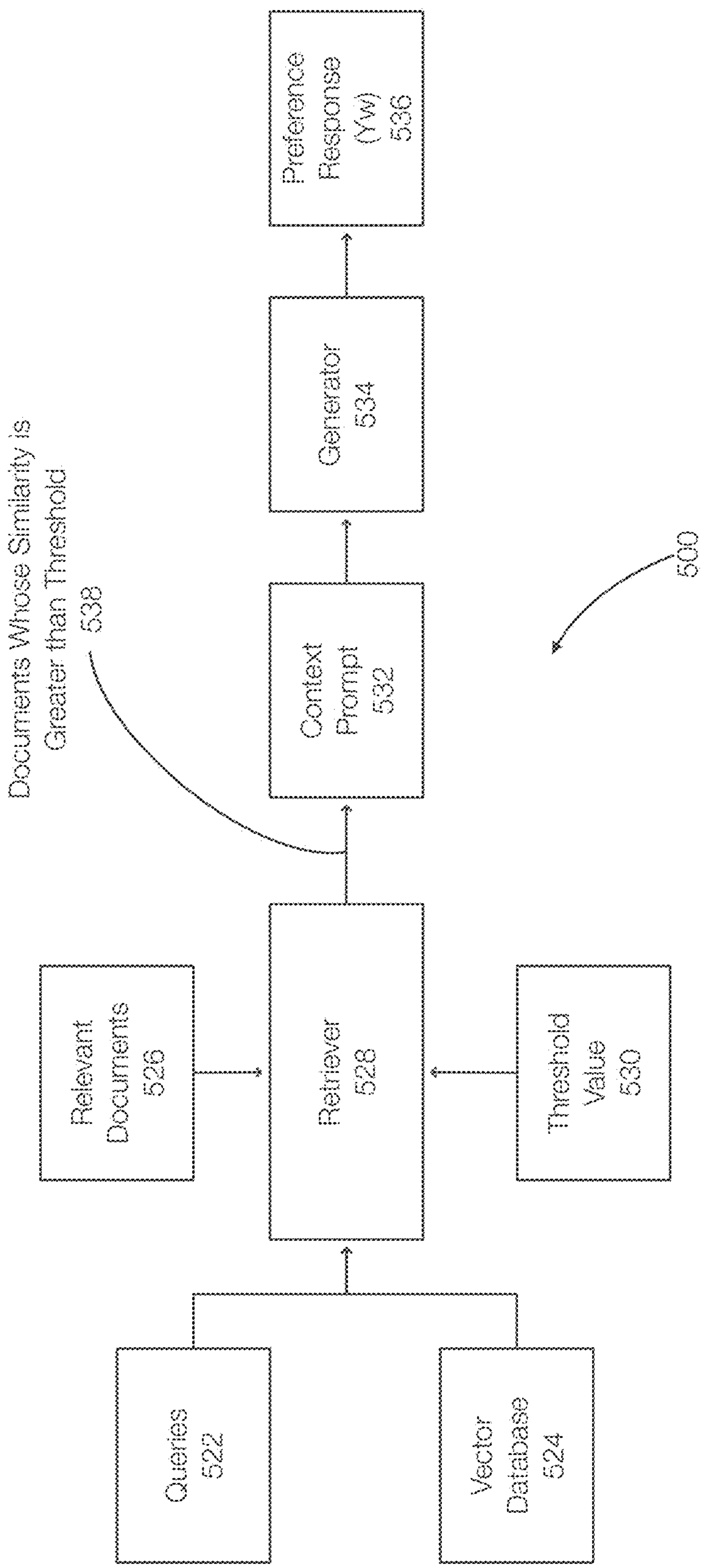
Figure 5C:
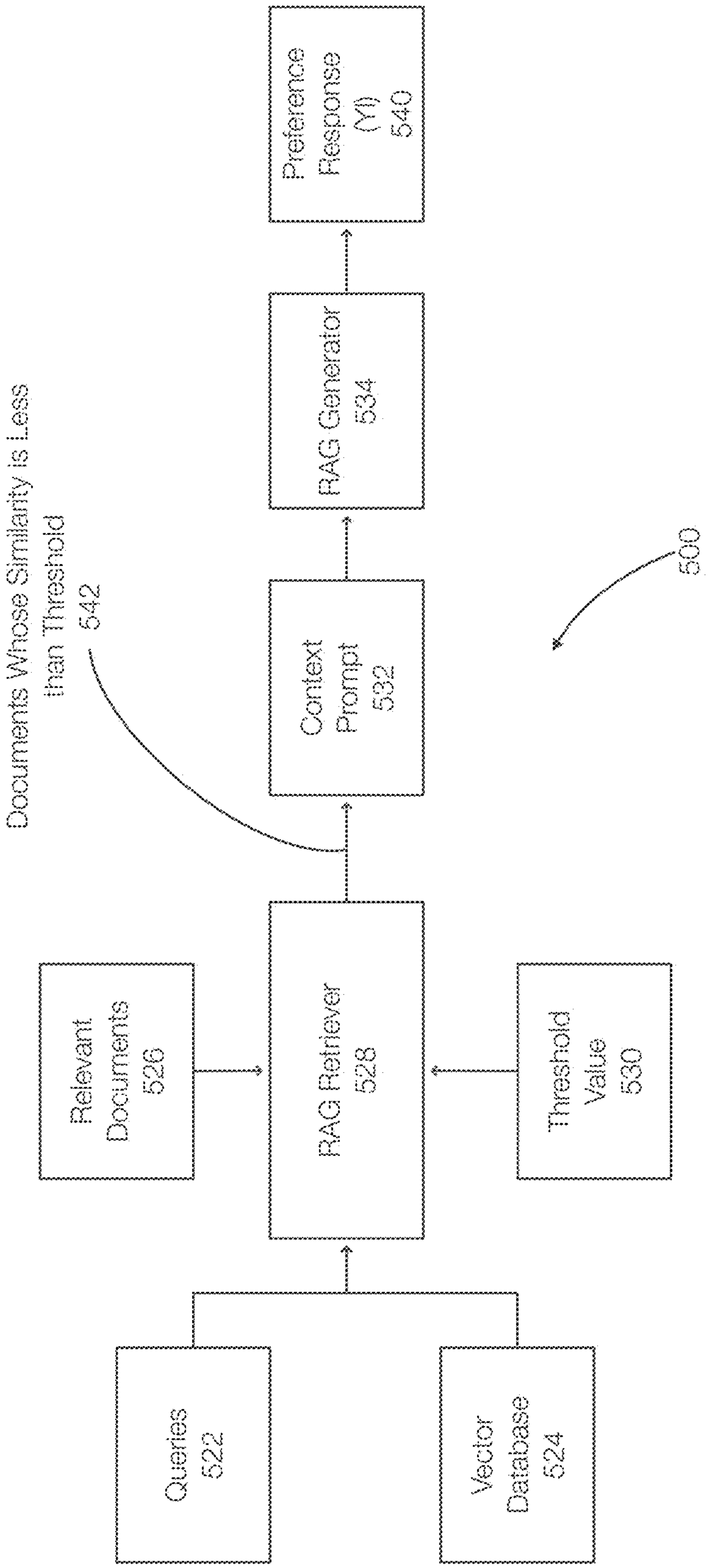

FIGS. 5B and 5C discloses aspects of automatically generating a preference dataset. FIG. 5B focuses on generating preference responses and FIG. 5C focuses on generating non-preference responses. FIG. 5B illustrates queries 522 and a vector database 524, and relevant documents 526. The RAG system 500 may be an existing RAG system that includes a RAG retriever 528 and a RAG generator 534.

As previously stated, the quality of the responses generated by the RAG system 500 may depend on the relevant documents 526 and/or on the ability of the RAG retriever 528 to find and rank the most relevant documents for each query, while optimizing the granularity of the context that is passed to the RAG generator 534 to generate the final response.

In this example, the preference dataset being generated in stage 1 includes triples with a format of (query, $y_w$, $y_l$). Thus, for each input query, factual preferences ($y_w$, $y_l$). With the preference response $y_w$ being a more precise and complete answer than the non-preference response $y_l$.

FIG. 5B illustrates aspects of retrieving the most relevant documents from a data source and incorporating the most relevant documents into the context prompt. More specifically, FIG. 5B discloses aspects of automatically generating a preference response to include in the preference dataset. In this example, a sensitivity of the retriever 528 is controlled by a threshold value 530 (e.g., a parameter t). The threshold value 530 sets a similarity threshold in the context of composing a context prompt.

The retriever 528 is configured to find relevant documents for a query. This is achieved by searching the vector database 524, which may include the relevant documents 526. A notion of similarity between the query and the content of the documents may be determined by measuring a distance between document vectors and a query vector. The documents can be ranked by similarity (documents closest in distance have the highest similarities). In one example, the k most relevant documents ranked by similarity with the input query are returned. The value of k may be set by default, determined by a user, or the like.

In one example, the documents ranked by the retriever 528 may or may not include the relevant documents 526. The documents identified by the retriever 528 in response to the queries 522 can be evaluated to determine whether the relevant documents 526 are first in the list of k documents identified by the retriever 528. If the relevant document 526 are first in the list, no change is performed on the list. If the relevant documents 526 are not at the top of the list, the relevant documents 526 are relocated to the top of the list. Thus, the list of documents retrieved by the retriever 528 is organized or sorted such that the most relevant documents 526 are at the top of the list. The threshold value 530 may determine which of the documents in the list are used as context for a prompt.

Thus, the retriever 528 identifies documents 538 whose similarity is greater than the threshold value 530. These documents 538 are included in the context prompt 532 and the enhanced prompt 532 is input to the generator 534. The response is an example of a preference response $y_w$ 536.

FIG. 5C discloses aspects of generating non-preference responses to include in the preference dataset. In FIG. 5C, the RAG system 500 is configured to ensure that the least relevant (or less relevant) documents 542 are identified and incorporated into the context prompt 532. In one example, generating the non-preference responses may include ensuring that the documents 542 do not include any of the relevant documents 526. For example, after reordering or sorting the list of documents recovered by the retriever 528 to include the relevant documents 526 at the top of the list, only documents in the list whose similarity is less than the threshold value 530 are included in the document 542.

Thus, when generating a non-preference response, the context prompt 532 includes documents 542 whose similarity to the query is less than the threshold value 530. The context prompt 532 is then input to the generator 533 and the response is a non-preference response 540 that is generated automatically.

The ability to adjust the threshold value 530 may control or determine how many documents are added to the context prompt 532. After generating the preference responses and the non-preference responses for the queries 522 using the threshold value 530, a tensor of the form [queries, documents, $y_w$, $y_l$] may be generated. This tensor is an example of a preference dataset.

FIG. 5D discloses aspects an example of a method for automatically generating preference pairs. The method 550 receives 552 a tensor of [query, documents] pairs. The method 550 then iterates 554 through each of the pairs to generate preference responses 556 and non-preference responses 558. The preference responses are generated by creating a preference prompt 560 using documents whose similarity is greater than a threshold value and non-preference responses are generated by creating a non-preference prompt 562 using documents whose similarity is less than the threshold value. As documents are being identified or recovered by the retriever of the RAG system, the method 550 ensures that the most relevant documents are placed at the top of a list. Documents that have the highest similarity can be identified using structures other than lists.

By ordering the documents retrieved by the retriever according to their similarity values or similarity to a query, the threshold value can be used to determine which of the documents are sufficiently similar to the query and which of the documents not sufficiently similar to the query. The context prompts input to the generator to generate the preference responses 556 are generated 560 to include the most similar documents (similarity greater than a threshold value). The context prompts to input to the generator to generate the non-preference responses 558 are generated 562 to include the least similar documents (similarity less than a threshold value). As previously stated, the threshold value can be adjusted.

As illustrated in FIGS. 5A-5D, embodiments of the invention generate a preference dataset of triples (query, $y_w$, $y_l$). These triples are used as input during the second stage to align the generator in order to mitigate hallucinations. Using an extended DPO loss, weights of the generator can be adjusted to favor the preference responses rather than the non-preference responses.

In one example, an extended DPO is disclosed and is configured to align a generator in a RAG system. In one example, the extended DPO loss includes or incorporates, in addition to using the $y_w$ and $y_l$ preferences, a fixed standard response $y_s$, which response to "not knowing about a given input query" for which enough context is not available.

In one example, the extended DPO loss is transformed into a function that approximates $y_l$ with $y_s$. This is achieved by inverting the optimization direction.

As previously discussed, an original DPO loss for preferences $y_w$ and $y_l$ is:

$$\mathcal{L}_{DPO}(\pi_\theta;\pi_{ref}) = -\mathbb{E}_{(x,y_w,y_l)\sim D}\left[\log\sigma\left(\beta\log\frac{\pi_\theta(y_w\mid x)}{\pi_{ref}(y_w\mid x)} - \beta\log\frac{\pi_\theta(y_l\mid x)}{\pi_{ref}(y_l\mid x)}\right)\right].$$

In this example, $\sigma(x)$ is an increasing logistic sigmoid function with x, where x corresponds to the term $$\beta\log\frac{\pi_\theta(y_w\mid x)}{\pi_{ref}(y_w\mid x)} - \beta\log\frac{\pi_\theta(y_l\mid x)}{\pi_{ref}(y_l\mid x)}.$$

Figure 6:
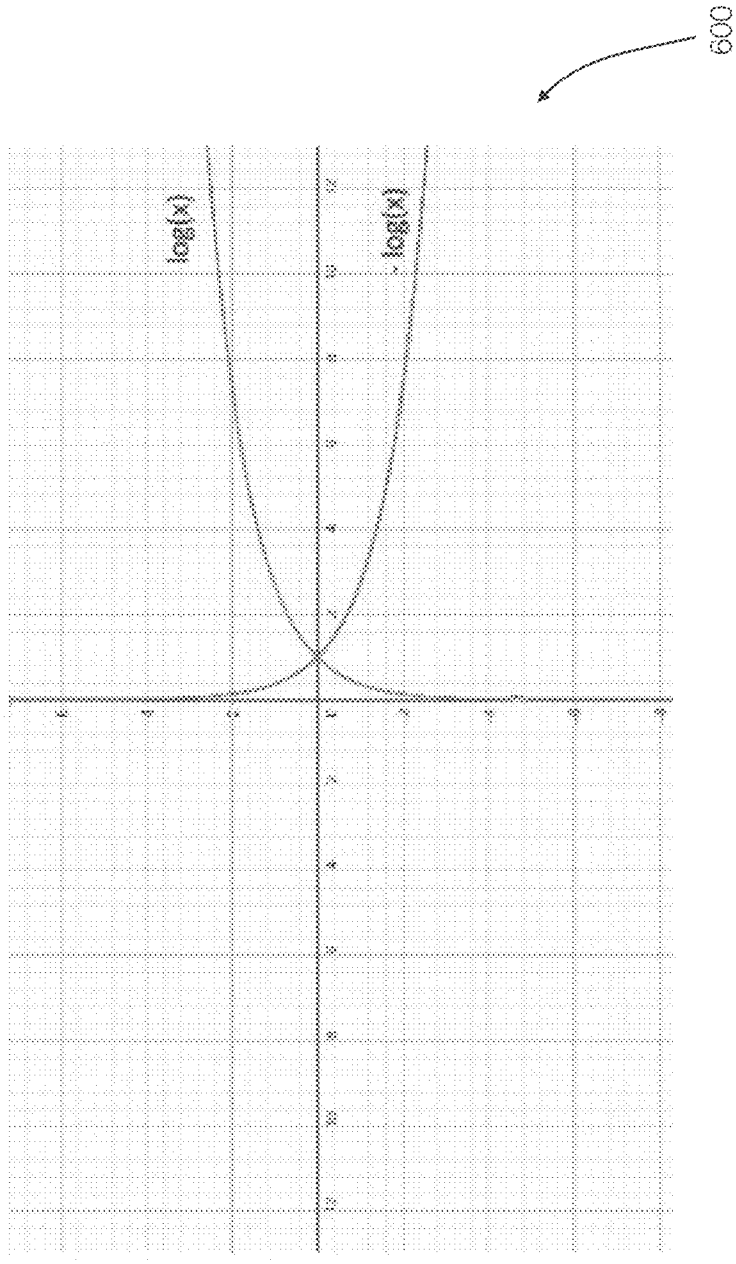
FIG. 6 discloses aspects of log curves related to maximizing and minimizing expressions in the context of extended direct policy optimization loss.

Maximizing x in this example favors the preference response $y_w$ over the non-preference response $y_l$. Given the negative sign in front of the expression, the loss needs to be minimized to achieve this objective as illustrated by the negative logarithm curve in the graph 600 of FIG. 6. FIG. 6 illustrates a visual representation of log(x) and −log(x) curves to facilitate understanding of a need to maximize or minimize expressions to approximate a model with preferences.

In one example, a copy of a RAG generator ($\pi_\theta$) is aligned according to the input queries and the triple [$y_w$, $y_l$, $y_s$] using backpropagation with the loss $L_c$. The original RAG generator ($\pi_{ref}$) remains frozen and serves as a reference to prevent the copy of the RAG generator $\pi_\theta$ being optimized from straying too far from its behavior. After a few updates, the RAG generator ($\pi_{ref}$) is replaced with the aligned copy of the RAG generator $\pi_\theta$. Thus, the RAG structure can output more accurate responses and can be used in various processes and applications.

Figure 7:
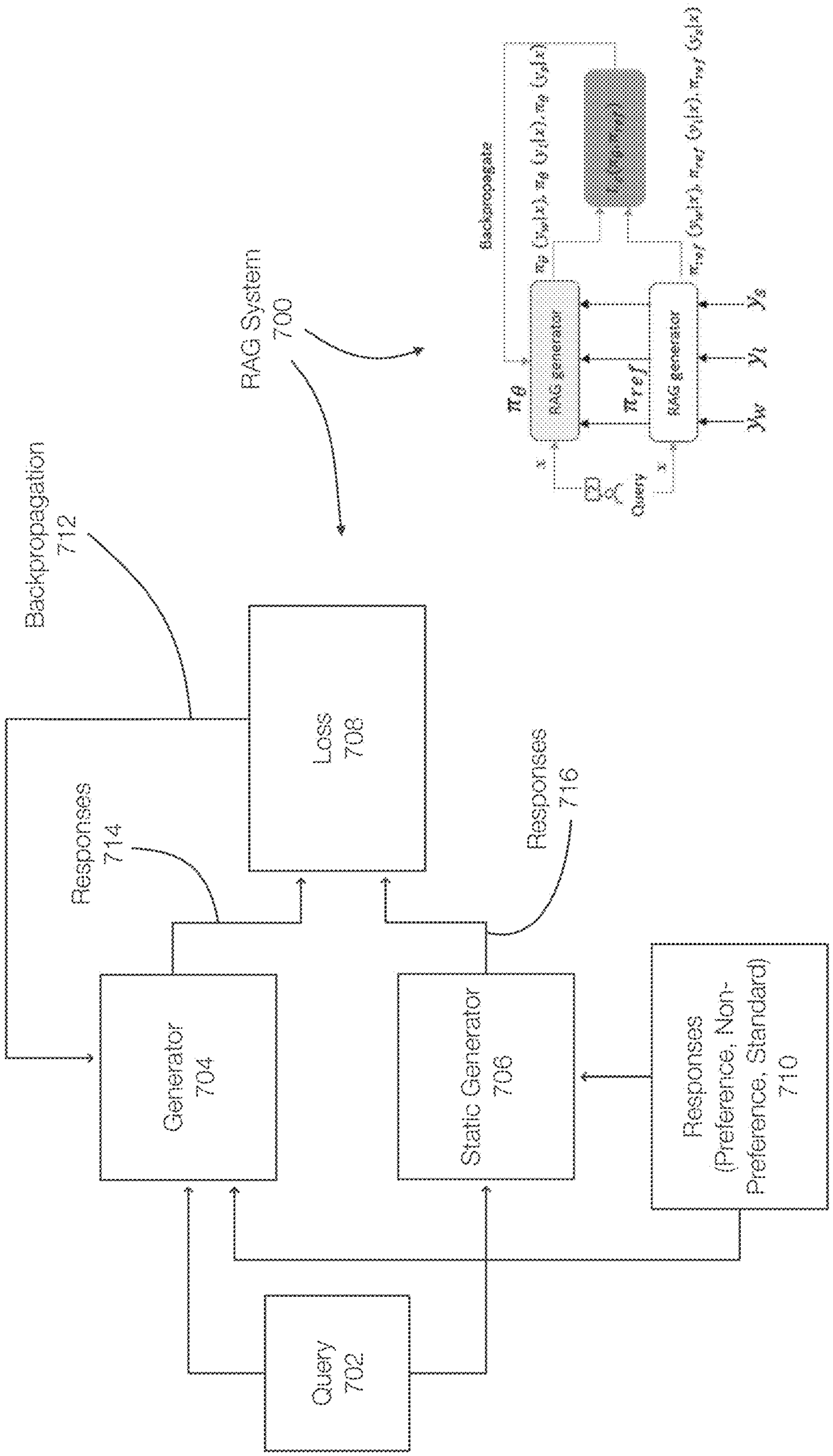
FIG. 7 discloses aspects of a retrieval augmented generation system with extended direct policy optimization loss to mitigate hallucinations.

FIG. 7 discloses aspects of updating a generator to mitigate hallucinations by aligning the generator using the automatically generated preference dataset. In this example, a copy of the generator 706 is made as generator 704. During the alignment operations, the generator 706 is kept frozen or static while the generator 704 is being updated or aligned using backpropagation 712.

In this example, a query 702 is input to the generator 704 and the static generator 706. During training, the query 702 and responses 710 (preference response $y_w$, non-preference response $y_l$, and a standard response $y_s$) from the preferences dataset are input or provided to the generator 704 and the static generator 706. Responses 714 are generated by the generator 704 and responses 716 are generated by the static generator 706. The loss 708 (e.g., an extended DPO loss) is determined and backpropagation 712 is performed to update the generator 704. The standard response $y_s$ ensures or helps ensure that the generator 704 being optimized or updated does not stray too far from its behavior. FIG. 7 thus illustrates an example of updating a generator using a copy generator 704, the triples (query, $y_w$, $y_l$) and the standard answer $y_s$ to align the generator 704.

Figure 8B:
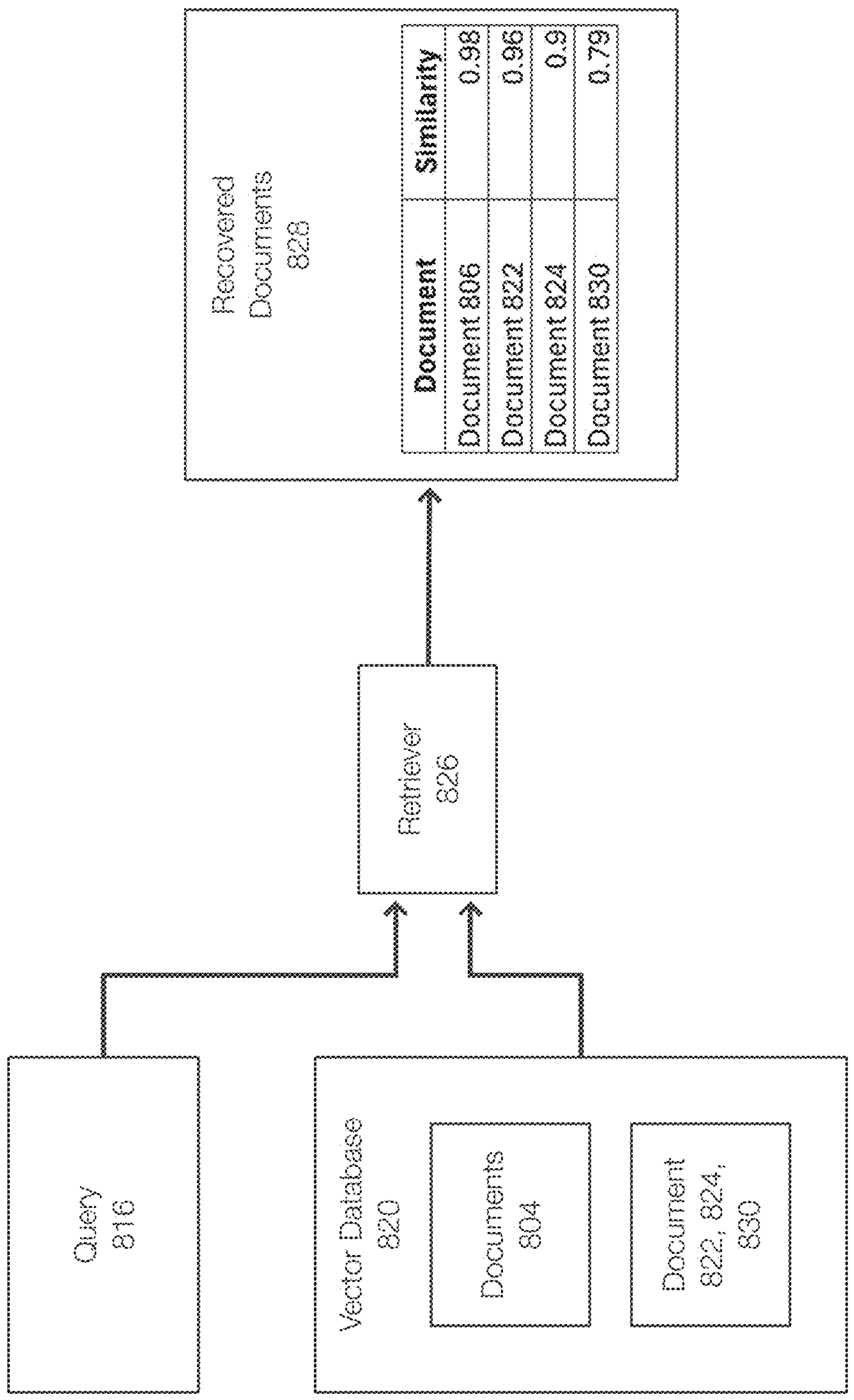

FIGS. 8A-8E illustrate an example of updating a generator to mitigate hallucinations in a question/answer application and more specifically of generating a preference dataset. FIG. 8A discloses an example of query-document pairs. The table 800 illustrates queries 802 and documents 804 associated with the queries 802. In this example, the documents 804 are examples of relevant documents. The table 800 is arranged to associate the most relevant documents 804 to corresponding queries. For example, the documents 806 and 808 are the most relevant documents for the query 816.

FIG. 8B discloses aspects of documents retrieved by a retriever such as a RAG retriever. In FIG. 8B, the relevant documents 804 have been incorporated into the vector database 820 along with other documents, represented by documents 822, 824, and 830. The query 816 is "What are the connectivity options for product 1?".

The retriever 826 used the query 816 to retrieve documents from the vector database 820. In this example, the retrieved or recovered documents 828 (and their similarities to the query) include document 806, document 822, document 824, and document 830.

The relevant documents 804 indicate that the recovered documents 828 for the query 816 should have included the documents 806 and 808. Thus, the document 808 is missing from the recovered documents 828.

Thus, using the recovered documents 828 may not guarantee the best possible response to the query 816.

Figure 8C:
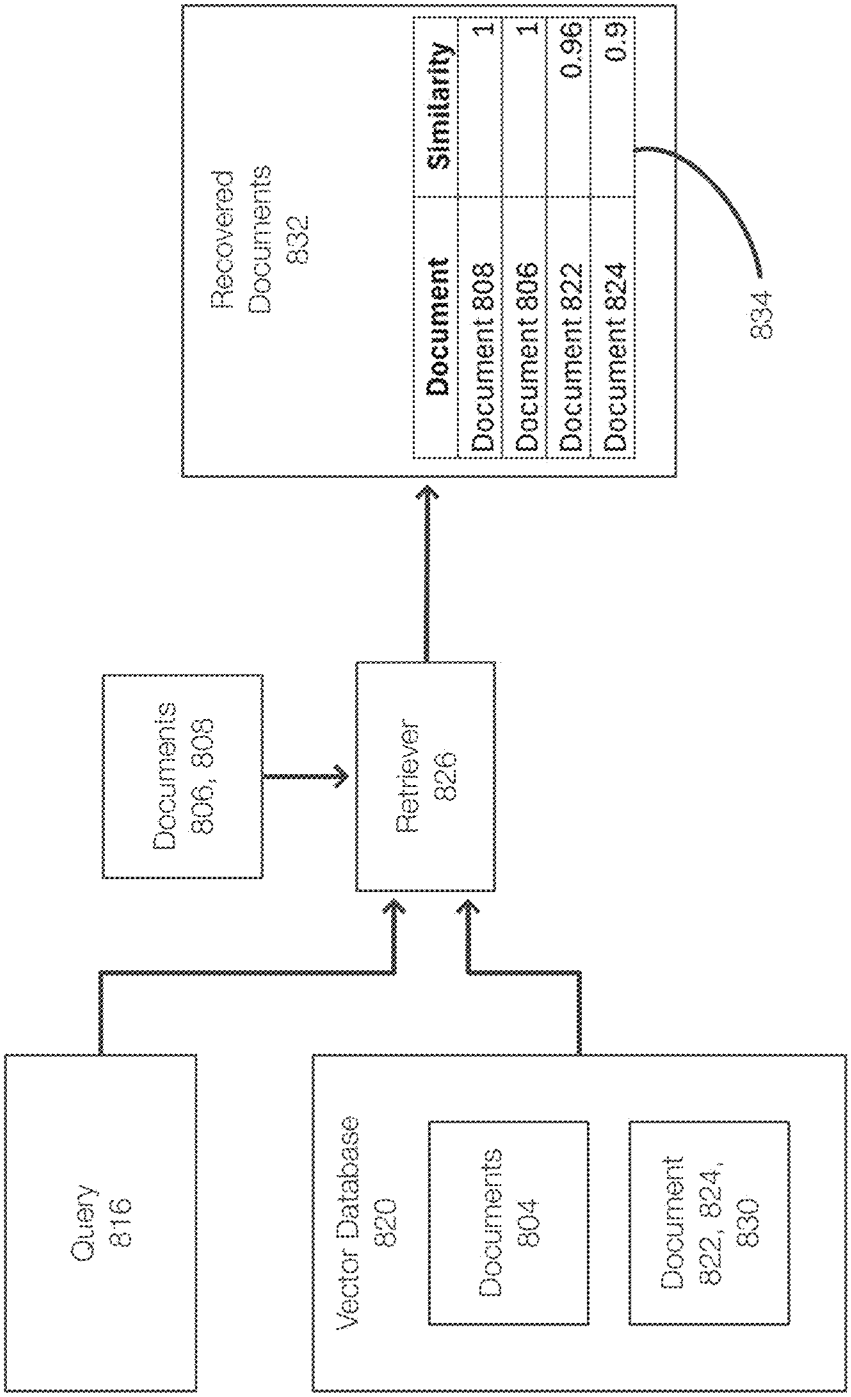

FIG. 8C illustrates an example of reordering and/or changing a list of recovered documents. In this example, because the most relevant document (documents 806, 808) for the query 816 are known, the list 834 of documents is changed to include the documents 806 and 808 at the top of the list 834. The documents 822 and 824 are the documents that have the highest similarity to the query 816.

Once the list 834 is reordered, the threshold value is used to determine which of the recovered documents 832 in the list 834 are used to form the context for the RAG generator. For example, if the threshold value $(\tau) \geq 0.97$, then the documents used in the context of the prompt are the documents 808 and 806.

Figure 8D:
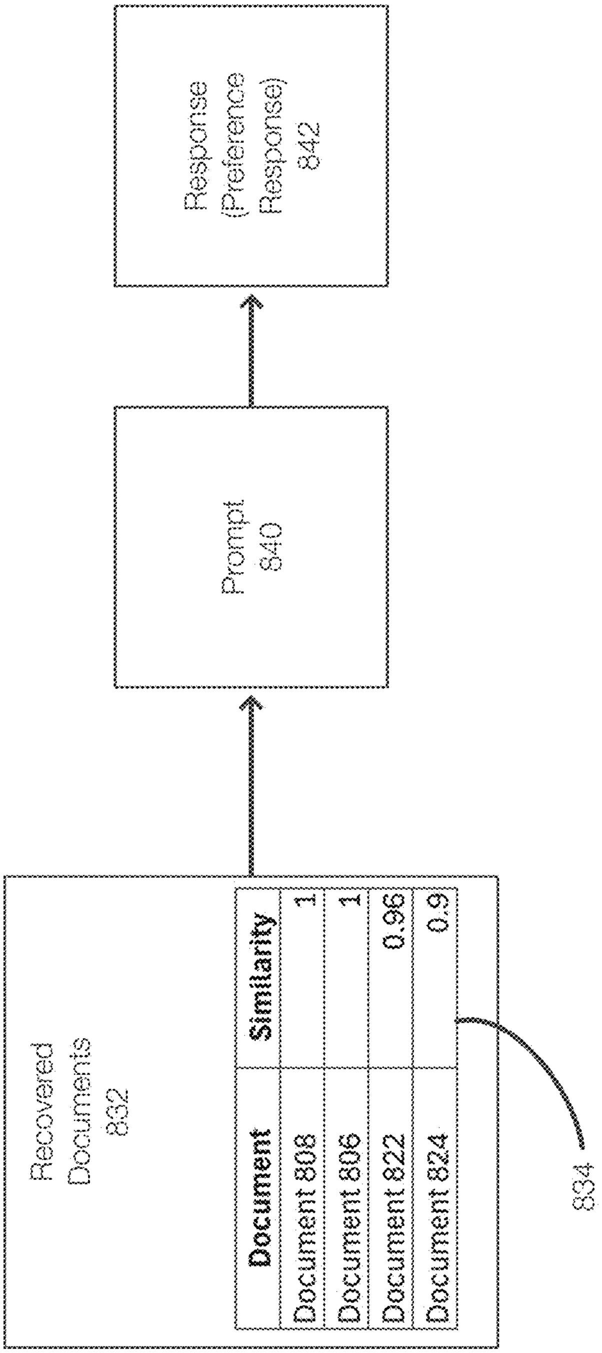

FIG. 8D illustrates an example of generating a preference response. In FIG. 8D, when the threshold value $(\tau) \geq 0.9$, the prompt 840 includes documents 808 and 806 as context. The prompt 840 is provided to an LLM and a response, the preference response 842, is generated as an output and included in the preference dataset.

Figure 8E:
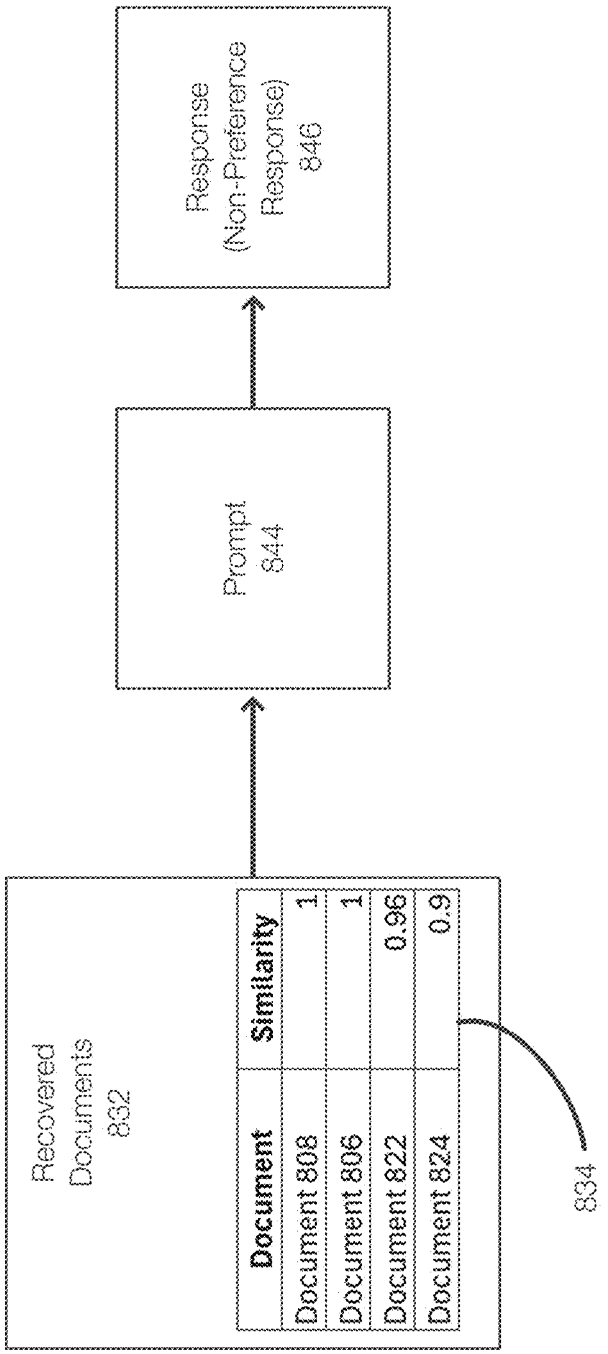

FIG. 8E illustrates an example of generating a non-preference response. In FIG. 8E, the threshold value is set to be $0.69 \leq$ threshold value $(\tau) \leq 0.96$ (a range in this example). Thus, the documents selected for including in the prompt 844 as context include the documents 822 and 824. These documents are less similar or less relevant to the query compared to the documents 808 and 806. As a result, the response 846 is a non-preference response.

FIGS. 8D and 8E illustrate that the threshold value can be used or set to select the most relevant documents or less relevant documents to include in a prompt. Setting the threshold value may impact a quality and/or accuracy of the resulting responses. A threshold value that is too low, for example, may result in a response that relies on less relevant documents and may be less accurate than a response generated using a higher threshold value.

The preference response 842 ($y_w$) may be "Product 1 offers a variety of connectivity options, including Wi-Fi 6, Bluetooth 5.1, USB-C ports with Thunderbolt 4 support, USB 3.2 ports, an HDMI port, and a docking option". The non-preference response 846 ($y_l$) may be "Product 1 is a business laptop that offers the most diverse and modern forms of connectivity".

FIGS. 8D and 8E illustrate that the preference response 842 is more precise at least because the documents selected as context container more relevant information about product 1. In contrast, the non-preference response 846 is more generalized because the documents selected for context are less relevant and may not contain relevant information.

In some examples, some documents that are not as related to the query as the relevant documents may be included in the prompt that generates the preference response, according to the threshold value. Adding more or fewer documents to the context prompt can be either beneficial or harmful depending on the nature of the input query or the similarity of the documents retrieved from the database. Thus, the threshold prompt is adjustable. In some examples, it may be harmful to irrelevant documents to generate accurate responses. However, on some occasions, additional related documents may bring more context to a given query and help to construct a precise response.

In another example, the extended loss is configured to mitigate hallucinations in a RAG system. For example, embodiments of the invention may be used to align a RAG generator in the context of a virtual sales assistant. Extended DPO loss may be used to improve the accuracy and relevant of products recommended to customers.

For example, a query may be received as follows:

query: I'm looking for a computer for video editing and gaming.

In this example the preference response is:

$y_w$: For video editing and gaming, I recommend the Product X, which has an NVIDIA RTX 3050 Ti graphics card, ideal for intense graphics tasks. It also has a 15-inch screen with 4 k resolution, perfect for editing videos and playing games with high image quality.

The non-preference response is:

$y_l$: The Product Y is a great option for you. It is light and economical, perfect for daily tasks and web browsing.

The standard response is:

$y_s$: I have no information about this question. I can help you with something else.

In this case, the RAG generator may responds in line with the preference response $y_w$ if context about the input query is available. Training the RAG generator with extended DPO loss forces the model to favor accurate responses and penalize irrelevant responses, and at the same time, to respond with a standard response when it does not have enough context for inputs not seen during training. The extended DPO loss function aims to reduce the frequency and probability of occurrence of non-preference responses $y_l$ and at the same time, increase the probability of responding with a standard response $y_s$ than with a non-preference response $y_l$ during inference to mitigate hallucinations.

FIG. 9 illustrates an example implementing extended DPO loss. The method 900 is an example of implementing extended DPO loss to mitigate hallucinations in a RAG system. As illustrated in the method 900, the loss represents relationships between an output of a reference model or generator and a model or generator being optimized. This loss is backpropagated in the model being optimized during training.

It is noted that embodiments disclosed herein, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, prompt context generation operations, machine learning model, including LLM, operations, query operations, automatic preference response dataset generation operations, RAG system operations, retrieval operations, generation operations, generator training and/or alignment operations, or the like or combinations thereof. More generally, the scope of this disclosure embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data protection functionality for one or more clients. Another example of a cloud computing environment is one in which processing, data storage, data protection, and other services may be performed on behalf of one or more clients. Some example cloud computing environments in which embodiments may be employed include Microsoft Azure, Amazon AWS, Dell EMC Cloud Storage Services, and Google Cloud. More generally however, the scope of this disclosure is not limited to employment of any particular type or implementation of cloud computing environment.

In addition to the cloud environment, the operating environment may also include one or more clients capable of collecting, modifying, and creating, data. As such, a particular client or server or other computing system may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, servers and clients, for example, may likewise take the form of software, physical machines, containers, or virtual machines (VMs), though no particular component implementation is required for any embodiment.

As used herein, the term 'data' or 'object' is intended to be broad in scope. Example embodiments are applicable to any system capable of storing and handling various types of objects, in analog, digital, or other form. Synthetic documents and/or corresponding labels are examples of data or objects. An object may be a portion of a document image.

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments. These are presented only by way of example and are not intended to limit the scope of this disclosure or the claims in any way.

Embodiment 1. A method comprising: retrieving a list of documents from data sources based on the query using a retriever of the RAG system, wherein each document in the list of documents is associated with a similarity value, changing the list of documents, when necessary, to place the first documents at a top of the list, generating a first prompt that includes a first context including first documents in the list of documents whose similarity values are above a threshold value, generating a second prompt that includes a second context including second documents in the list of documents whose similarity values are below the threshold value, generating a preference response using the first prompt and generating a non-preference response using the second prompt, and storing the query, the preference response and the non-preference in a preference dataset as a tuple, wherein the preference dataset includes multiple tuples, and aligning a generator of the RAG system with the preference dataset.

Embodiment 2. The method of embodiment 1, wherein documents in the list of documents are identified based on a similarity value between the documents and the query that is derived from vector representations of the documents and the query.

Embodiment 3. The method of embodiment 1 and/or 2, further comprising adjusting the threshold value.

Embodiment 4. The method of embodiment 1, 2, and/or 3, further comprising adjusting the threshold value based on a number of documents to be included in the first context and/or the second context.

Embodiment 5. The method of embodiment 1, 2, 3, and/or 4, wherein the threshold value includes a first range for identifying the first documents and a second range for identifying the second documents.

Embodiment 6. The method of embodiment 1, 2, 3, 4, and/or 5, wherein the aligning the generator of the RAG system comprises instantiating a copy of the generator and optimizing the copy of the generator while freezing the generator.

Embodiment 7. The method of embodiment 1, 2, 3, 4, 5, and/or 6, further comprising determining an extended loss during the alignment based on inputs to the generator and to the copy of the generator and backpropagating the extended loss in the copy of the generator, wherein the inputs include the query, a preference response, a non-preference response, and a standard response.

Embodiment 8. The method of embodiment 1, 2, 3, 4, 5, 6, and/or 7, wherein the extended loss is related to a preference response, a non-preference response, and a standard response.

Embodiment 9. The method of embodiment 1, 2, 3, 4, 5, 6, 7, and/or 8, further comprising aligning the copy of the generator to favor the preference response and to penalize less relevant responses, and to respond with the standard response when context is insufficient.

Embodiment 10. The method of embodiment 1, 2, 3, 4, 5, 6, 7, 8, and/or 9, further comprising deploying an updated RAG system that includes the retriever and the copy of the generator.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 10:
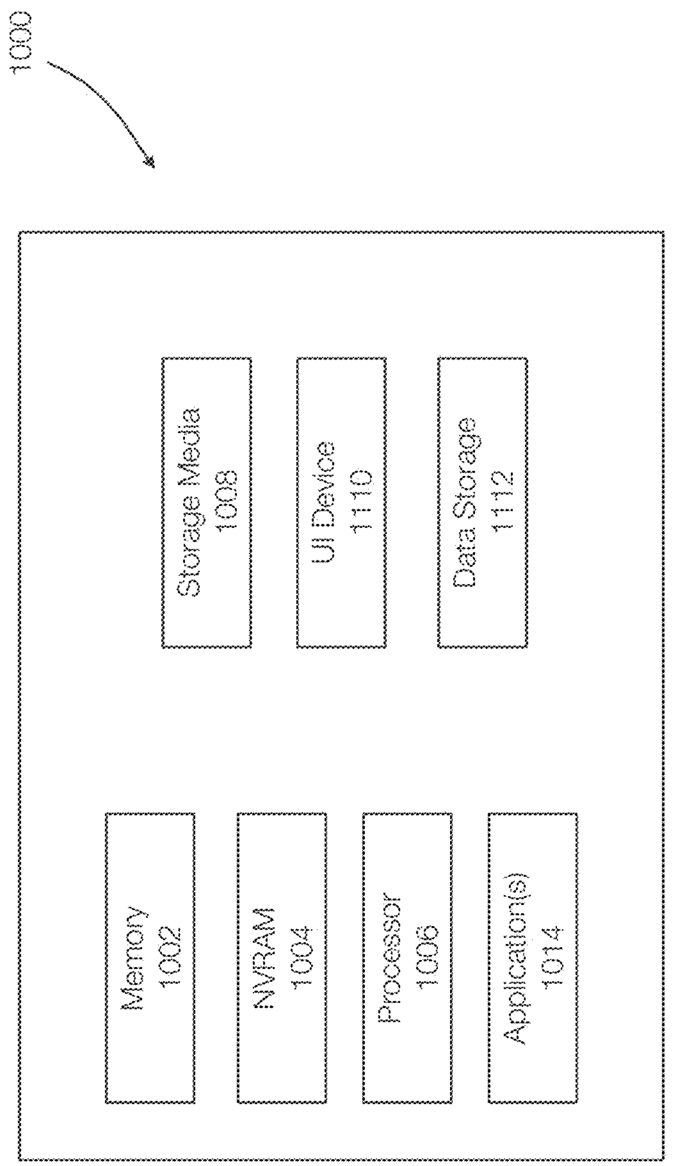
FIG. 10 discloses aspects of a computing device, system, or entity.

With reference briefly now to FIG. 10, any one or more of the entities disclosed, or implied, by the Figures and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

The device 1000 may also represent a computing system such as a server or set of servers, an edge based computing system, a cloud-based computing system, or the like. The computing system may be localized or distributed in nature.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 1000 may also represent a physical or virtual machine or server, an edge-based computing system, a cloud-based computing system, server clusters or other computing systems or environments. The device 1000 may also represent multiple machines or devices, whether virtual, containerized, or physical. The device 1000 may perform or execute steps or acts of the methods illustrated in the Figures.

The device 1000 may represent a cloud-based system, an edge-based, system, an on-premise system, or combinations thereof. Document understanding, context generation, prompt engineering, and related operations may be performed using these types of computing environments/systems.

The described embodiments are to be considered in all respects only as illustrative and not restrictive. All changes which come within the meaning and range of equivalency of the claims are to be embraced within their scope.

What is claimed is:

1. A method comprising:
- receiving pairs into a retrieval augmented generation (RAG) system, wherein each of the pair includes a query and first documents associated with the query;
- retrieving a list of documents from data sources based on the query using a retriever of the RAG system, wherein each document in the list of documents is associated with a similarity value;
- changing the list of documents, when necessary, to place the first documents at a top of the list;
- generating a first prompt that includes a first context including first documents in the list of documents whose similarity values are above a threshold value;
- generating a second prompt that includes a second context including second documents in the list of documents whose similarity values are below the threshold value;
- generating a preference response using the first prompt and generating a non-preference response using the second prompt; and
- storing the query, the preference response and the non-preference in a preference dataset as a tuple, wherein the preference dataset includes multiple tuples; and
- aligning a generator of the RAG system with the preference dataset.

2. The method of claim 1, wherein documents in the list of documents are identified based on a similarity value between the documents and the query that is derived from vector representations of the documents and the query.

3. The method of claim 1, further comprising adjusting the threshold value.

4. The method of claim 3, further comprising adjusting the threshold value based on a number of documents to be included in the first context and/or the second context.

5. The method of claim 3, wherein the threshold value includes a first range for identifying the first documents and a second range for identifying the second documents.

6. The method of claim 1, wherein the aligning the generator of the RAG system comprises instantiating a copy of the generator and optimizing the copy of the generator while freezing the generator.

7. The method of claim 6, further comprising determining an extended loss during the alignment based on inputs to the generator and to the copy of the generator and backpropagating the extended loss in the copy of the generator, wherein the inputs include the query, a preference response, a non-preference response, and a standard response.

8. The method of claim 7, wherein the extended loss is related to a preference response, a non-preference response, and a standard response.

9. The method of claim 8, further comprising aligning the copy of the generator to favor the preference response and to penalize less relevant responses, and to respond with the standard response when context is insufficient.

10. The method of claim 9, further comprising deploying an updated RAG system that includes the retriever and the copy of the generator.

11. A non-transitory storage medium having stored therein instructions that are executable by one or more hardware processors to perform operations comprising:
- receiving pairs into a retrieval augmented generation (RAG) system, wherein each of the pair includes a query and first documents associated with the query;
- retrieving a list of documents from data sources based on the query using a retriever of the RAG system, wherein each document in the list of documents is associated with a similarity value;
- changing the list of documents, when necessary, to place the first documents at a top of the list;
- generating a first prompt that includes a first context including first documents in the list of documents whose similarity values are above a threshold value;
- generating a second prompt that includes a second context including second documents in the list of documents whose similarity values are below the threshold value;
- generating a preference response using the first prompt and generating a non-preference response using the second prompt; and
- storing the query, the preference response and the non-preference in a preference dataset as a tuple, wherein the preference dataset includes multiple tuples; and
- aligning a generator of the RAG system with the preference dataset.

12. The non-transitory storage medium of claim 11, wherein documents in the list of documents are identified based on a similarity value between the documents and the query that is derived from vector representations of the documents and the query.

13. The non-transitory storage medium of claim 11, further comprising adjusting the threshold value.

14. The non-transitory storage medium of claim 13, further comprising adjusting the threshold value based on a number of documents to be included in the first context and/or the second context.

15. The non-transitory storage medium of claim 13, wherein the threshold value includes a first range for identifying the first documents and a second range for identifying the second documents.

16. The non-transitory storage medium of claim 11, wherein the aligning the generator of the RAG system comprises instantiating a copy of the generator and optimizing the copy of the generator while freezing the generator.

17. The non-transitory storage medium of claim 16, further comprising determining an extended loss during the alignment based on inputs to the generator and to the copy of the generator and backpropagating the extended loss in the copy of the generator, wherein the inputs include the query, a preference response, a non-preference response, and a standard response.

18. The non-transitory storage medium of claim 17, wherein the extended loss is related to a preference response, a non-preference response, and a standard response.

19. The non-transitory storage medium of claim 18, further comprising aligning the copy of the generator to favor the preference response and to penalize less relevant responses, and to respond with the standard response when context is insufficient.

20. The non-transitory storage medium of claim 19, further comprising deploying an updated RAG system that includes the retriever and the copy of the generator.

* * * * *